United States Patent
Kweon et al.

(10) Patent No.: US 8,139,046 B2
(45) Date of Patent: Mar. 20, 2012

(54) TOUCH SCREEN USING INFRARED CAMERA HARDLY AFFECTED BY EXTERNAL DISTURBANCE LIGHT

(75) Inventors: Chul Kweon, Daejeon (KR); Joo-Yeong Yoon, Daejeon (KR)

(73) Assignees: Combustec Co., Ltd, Seoul (KR); Chul Kweon, Daejeon (KR); Joo-Yeong Yoon, Daejeon (KR)

( * ) Notice: Subject to any disclaimer, the term of this patent is extended or adjusted under 35 U.S.C. 154(b) by 775 days.

(21) Appl. No.: 12/283,209

(22) Filed: Sep. 10, 2008

(65) Prior Publication Data

US 2009/0066671 A1    Mar. 12, 2009

(30) Foreign Application Priority Data

Sep. 10, 2007   (KR) .................. 10-2007-0091409

(51) Int. Cl.
G06F 3/042    (2006.01)
(52) U.S. Cl. ............... 345/175; 345/173; 178/18.01
(58) Field of Classification Search .......... 345/156–182; 178/18.01
See application file for complete search history.

(56) References Cited

U.S. PATENT DOCUMENTS 6,421,042 B1 *  7/2002  Omura et al. ............... 345/157
6,429,857 B1 *  8/2002  Masters et al. ............. 345/175

FOREIGN PATENT DOCUMENTS

JP    2000-132340       12/2000
KR    10-2007-0082958 A  8/2007

* cited by examiner

*Primary Examiner* — Kevin M Nguyen
*Assistant Examiner* — Kenneth B Lee, Jr.
(74) *Attorney, Agent, or Firm* — Kile Park Goekjian Reed & McManus PLLC (57) ABSTRACT

A touch screen using infrared cameras hardly affected by external disturbance light includes an infrared radiation base having a plurality of infrared emitting elements and the infrared cameras, thereby preventing malfunction resulting from the external disturbance light. The touch screen includes a body having a screen part to which an image is output, an infrared radiation base having a plurality of infrared emitting elements and disposed around the screen part in transverse and longitudinal directions, and infrared cameras receiving the infrared light emitted from the infrared emitting elements of the infrared radiation base and detecting the position of an object touched on the screen part according to whether or not the infrared light emitted from each infrared emitting element is received.

5 Claims, 7 Drawing Sheets

TOUCH SCREEN USING INFRARED CAMERA HARDLY AFFECTED BY EXTERNAL DISTURBANCE LIGHT

BACKGROUND OF THE INVENTION

1. Field of the invention

The present invention relates to a touch screen using infrared cameras and, more particularly, to a touch screen using infrared cameras hardly affected by external disturbance light, which includes an infrared radiation base having a plurality of infrared emitting elements and the infrared cameras, thereby preventing malfunction resulting from the external disturbance light.

2. Description of the Related Art

In general, a touch screen serves as an interface between a telecommunication apparatus using a display and a user. Particularly, the touch screen is an input device that can interface the user with such an apparatus by allowing the user to directly touch a screen part with a finger or a stylus.

This touch screen is the input device capable of allowing men and women of all ages to easily use the touch screen by touching a button displayed on the screen with a finger in order to manipulate a computer in an interactive and intuitive manner. As such, the touch screen is presently applied to various fields such as personal digital assistants (PDAs), liquid crystal displays (LCDs), cathode ray tubes (CRTs), banks, government and public offices, various kinds of medical equipment, tourism and main organization information services, traffic information services, and so on.

As for one of the representative techniques realizing the touch screen, a resistive film technique is configured so that a thin metal sheet is attached to X- and Y-axial sides on which chemicals are applied between a glass panel and a thin film. When this type of panel is powered on, a predetermined quantity of resistance is generated in the panel. Then, when a finger or the other object touches a portion of the panel, the chemicals respond to such a touch, and thus the resistance is abruptly varied. In the metal sheet, a positional coordinate, at which the object is touched, is detected from the variation of the resistance.

However, in the case of this resistive film technique of the conventional touch screen, it is difficult to apply the resistive film technique to a large screen, and the resistive film is easily damaged. Thus, it is impossible to apply the resistive film technique to a screen having a portion that is frequently touched by the user or the other object.

Further, another technique realizing the touch screen is configured to recognize a coordinate on the screen using visible light or infrared light. Among them, the touch screen using the infrared light arranges infrared transceiving elements throughout an outer circumference thereof, so that the number of the infrared transceiving elements is increased, and the production costs are increased. Particularly, in the case in which the touch screen is greatly influenced by an external environment, for instance, by sudden exposure to strong light, the touch screen is directly influenced by external disturbance light, so that an infrared receiving part of the infrared receiving element abnormally represents peak detection value. Thus, although no touch is performed by the user, a detection value of the infrared receiving part is recognized to be remarkably low compared to the abnormally increasing peak detection value, so that the touch screen recognizes that the object exists. Consequently, the touch screen is very vulnerable to the external disturbance light.

SUMMARY OF THE INVENTION

Accordingly, the present invention has been made to solve the above-mentioned problems occurring in the prior art and an object of the present invention is to provide a touch screen using infrared cameras hardly affected by external disturbance light, in which each infrared camera has the filtering function of a band-pass filter capable of interrupting the external disturbance light such as natural light or artificial light and selectively detecting only infrared light, thereby preventing malfunction caused by the external disturbance light.

Another object of the present invention is to provide a touch screen using infrared cameras, which reduces the number of detectors used for the touch screen, is applied to a large screen, and realizes a high-efficiency function at an inexpensive cost.

Accordingly, in order to solve the problems occurring in the related art, according to an embodiment of the present invention, there is provided a touch screen, which comprises: a body having a screen part to which an image is output; an infrared radiation base disposed around the screen part in transverse and longitudinal directions and divided into a plurality of sub-bases including at least one infrared emitting element emitting infrared light in order to prevent malfunction caused by external disturbance light; and infrared cameras receiving the infrared light emitted from the infrared emitting element of each sub-base of the infrared radiation base, and detecting a position of an object touched on the screen part according to whether or not the infrared light emitted from the infrared emitting element is received.

According to another embodiment of the present invention, two infrared cameras are provided, in which each infrared camera has an intersecting orientation angle at one edge of the screen part at which the infrared radiation base is not disposed.

According to another embodiment of the present invention, each infrared camera may include: an infrared detector having a plurality of infrared receiving cells; a lens having an angle of view for receiving the infrared light incident onto the entire screen part; a band-pass filter filtering the infrared light with a wavelength band passing through the lens to pass only the filtered infrared light; an infrared receiver receiving the infrared light filtered by the band-pass filter; and an interface outputting the detected results to the body when the infrared detector detects a touch of an object.

According to another embodiment of the present invention, the infrared detector may include one of a complementary metal oxide semiconductor (CMOS) image sensor and a charge coupled device (CCD) image sensor.

According to another embodiment of the present invention, the infrared detector may be installed on the screen part so as to have the orientation angle of 90 degrees or more, and receive the infrared light emitted from each infrared emitting element within a corresponding orientation angle.

According to another embodiment of the present invention, the infrared detector may include the plurality of infrared receiving cells, each of which is installed so as to have a different orientation angle and receives the infrared light emitted from each infrared emitting element of the infrared radiation base.

According to another embodiment of the present invention, the infrared radiation base may include a diffusing unit for diffusing the infrared light. The diffusing unit is provided at a front surface of the infrared radiation base toward which the infrared emitting element is directed.

As described above, according to embodiments of the present invention, each infrared camera has the band-pass filter that interrupts external disturbance light and infrared light, so that the touch screen is free from malfunction caused by the external disturbance light, and thus considerably improves reliability and performance of the products.

Further, the touch screen includes the infrared cameras and the infrared emitting elements, so that the number of detecting sensors is sharply reduced, and thus the production costs are reduced.

DESCRIPTION OF THE EMBODIMENTS

Reference will now be made in detail to an exemplary embodiment of the invention, an example of which is illustrated in the accompanying drawings.

Figure 1:
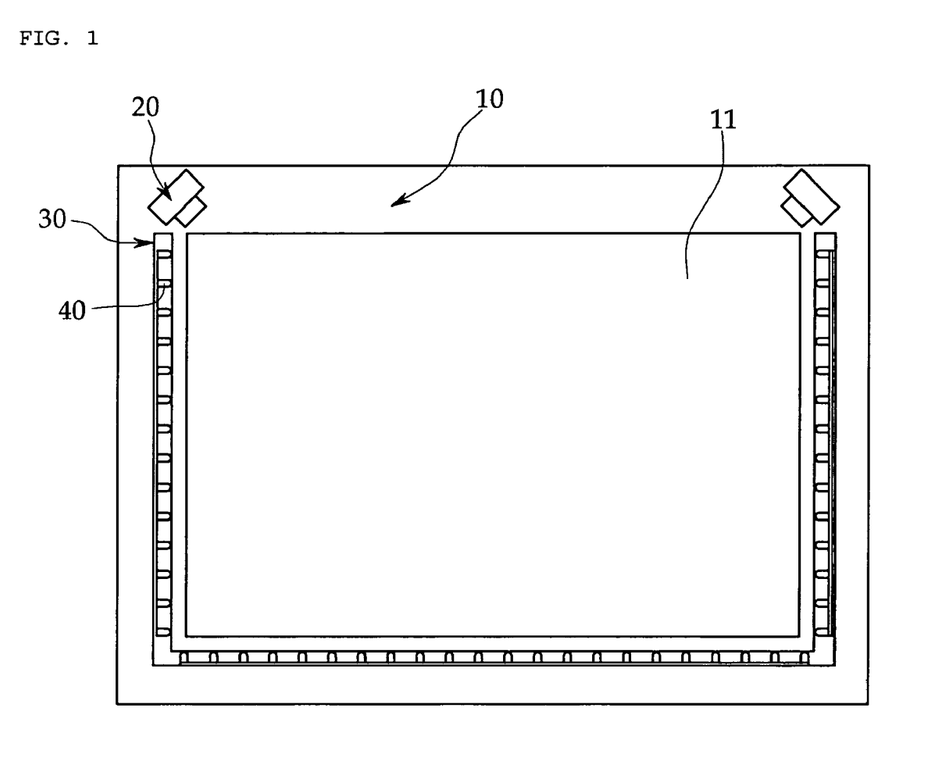
FIG. 1 is a top plan view illustrating a touch screen using infrared cameras according to an exemplary embodiment of the present invention.

FIG. 1 is a top plan view illustrating a touch screen using infrared cameras according to an exemplary embodiment of the present invention.

Referring to FIG. 1, the touch screen using infrared cameras 20 includes a body 10, which has a screen part 11 to which an image is output, an infrared radiation base 30, which is disposed around the screen part 11 on X and Y axes, and is divided into a plurality of sub-bases including infrared emitting elements 31 emitting infrared light, and infrared cameras 20, which detect touch or position of an object on the screen part 11 by checking whether or not the infrared light emitted from each infrared emitting element 31 is interrupted.

Here, taking an example as illustrated in FIG. 1, the infrared radiation base 30 is installed on X- and Y-axial edges other than an upper edge of the screen part 11 in longitudinal and transverse directions, and the infrared emitting elements 31 placed on the infrared radiation base 30 are installed toward the screen part 11.

The infrared cameras 20 are installed on left-hand and right-hand sides of the upper edge of the screen part 11 on which the infrared radiation base 30 is not installed, respectively. Each infrared camera 20 photographs an entire region of the screen part 11 at an intersecting orientation angle.

Figure 2:
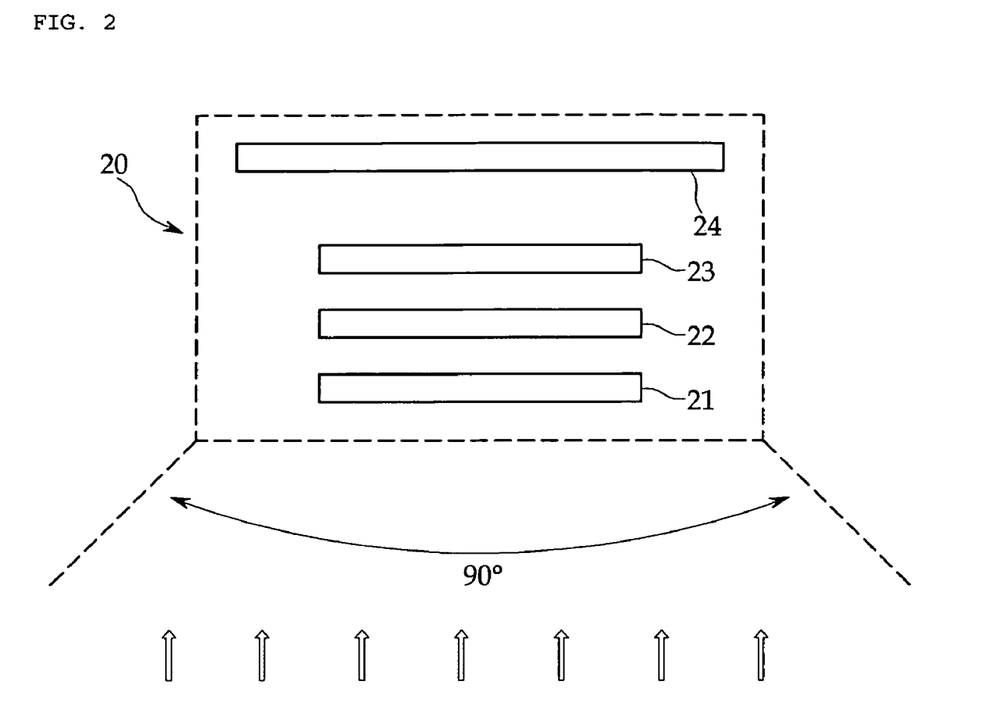
FIG. 2 is a block diagram illustrating an infrared camera in a touch screen using infrared cameras according to an exemplary embodiment of the present invention.

FIG. 2 is a block diagram illustrating an infrared camera in a touch screen using infrared cameras according to an exemplary embodiment of the present invention.

Referring to FIG. 2, the infrared camera 20 includes a lens 21 having an angle of view covering at least 90 degrees, a band-pass filter 22 that passes only infrared light with a wavelength band ranging from 850 nm to 940 nm and rejects infrared light with a wavelength band outside that range, an infrared detector 23 that has a plurality of infrared receiving cells (e.g., 512 infrared receiving cells), each of which is oriented to a different direction and receives the infrared light emitted from each infrared emitting element 31, and an interface 24 that converts optical signals of the infrared detector 23 into electrical signals and outputs the converted electrical signals to a controller. Here, the controller (not shown) is installed in the body 10, receives the signals that are detected by the infrared camera 20 and are output through the interface 24, and outputs a corresponding control signal.

The lens 21 is oriented toward the entire region of the screen part 11, and receives and passes the infrared light emitted from the sub-bases of the infrared radiation base 30 arranged on the lateral edges and lower edges other than the upper edge of the screen part 11. At this time, the infrared camera 20 is installed on the opposite sides of the upper edge of the screen part 11 so as to have an intersecting orientation angle. Thus, the lens 21 of the infrared camera 20 has the view angle of at least 90 degrees, and thus is preferably oriented toward the sub-bases of the infrared radiation base 30 which are arranged from one of the lateral edges to the lower edge.

When natural light passing through the lens 21 or the infrared light emitted from the infrared radiation base 30 as an artificial lighting device is incident, the band-pass filter 22 selectively passes only the infrared light with a wavelength band ranging from 850 nm to 940 nm among the incident light. Preferably, the band-pass filter 22 prevents passing of external disturbance light by passing only the infrared light with a wavelength band (ranging from 850 nm to 940 nm) narrower than that (for instance, ranging from 780 nm to 1100 nm) of the infrared light emitted from the infrared emitting elements 31.

The infrared detector 23 may employ a complementary metal oxide semiconductor (CMOS) or charge coupled device (CCD) image sensor, in which the infrared receiving cells, for instance designated by specific index numbers from 1 to 152, are installed, and are oriented in different directions. Thus, the infrared receiving cells receive the infrared light emitted from the infrared emitting elements 31. When the touch screen is powered on, the infrared receiving cells receive the infrared light from the infrared emitting elements 31 while no object touches the screen part 11. In contrast, when any object touches the screen part 11, the infrared light is interrupted by the touched object, and thus at least one of the infrared receiving cells does not receive the infrared light. In this case, the infrared receiving cells output detection signals. At this time, since the infrared receiving cells are oriented at different angles as described above, the infrared receiving cells output the detection signals together with codes representing their own index numbers when the object touches the screen part 11. Thus, the controller determines the orientation angle of each infrared receiving cell by means of the index number of the infrared receiving cell, and recognizes a touch position of the object.

The interface 24 converts the signals output from the infrared detector 23 into electrical signals or the analog signals output from the infrared detector 23 into digital signals so as to enable the controller to recognize the converted signals. Here, the interface 24 can be variously deformed according to application of a user. For example, when the infrared detector 23 outputs the detection signals according to the touch on the object as the optical signals, the interface 24 converts the optical signals into the electrical signals, and then outputs the converted electrical signals to the controller. Otherwise, when the infrared detector 23 outputs the analog signals, the interface 24 converts the analog signals into the digital signals, and then outputs the converted digital signals to the controller.

Figure 3:
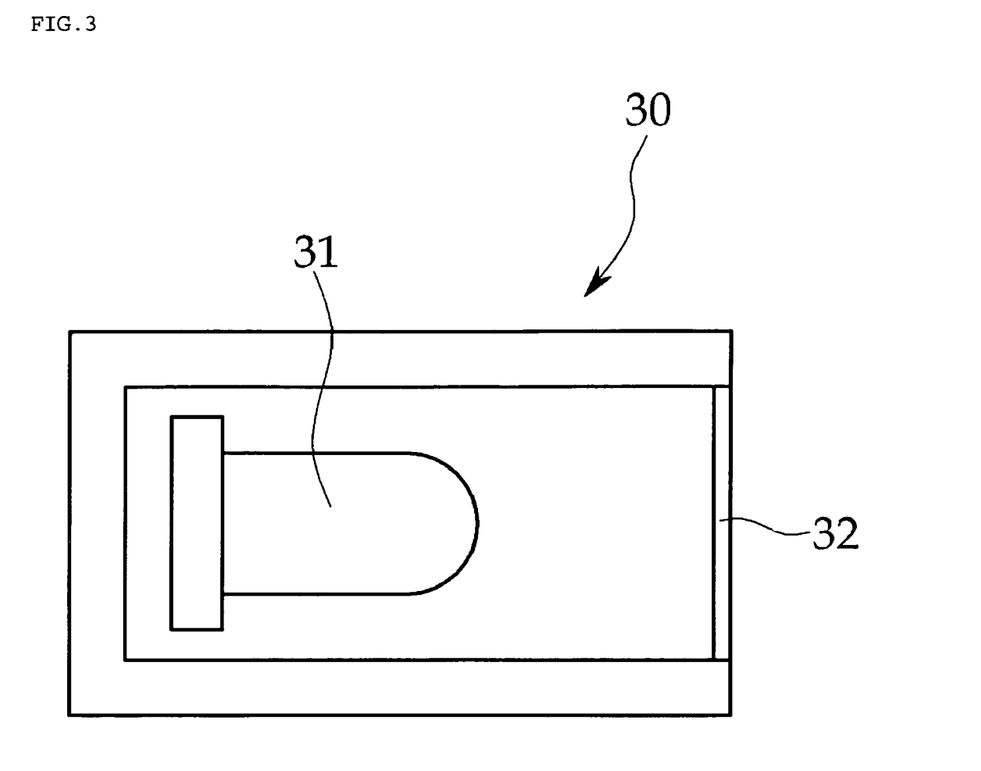
FIG. 3 is an enlarged top plan view illustrating an infrared radiation base in a touch screen using infrared cameras according to an exemplary embodiment of the present invention.
Figure 4:
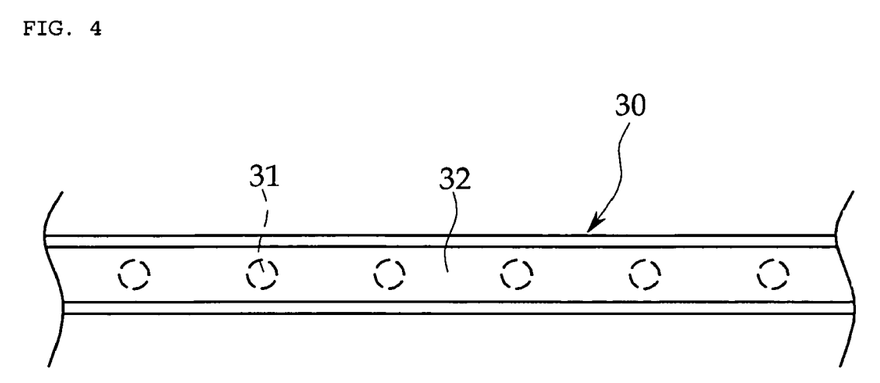
FIG. 4 is a front view illustrating an infrared radiation base in a touch screen using infrared cameras according to an exemplary embodiment of the present invention.
Figure 5:
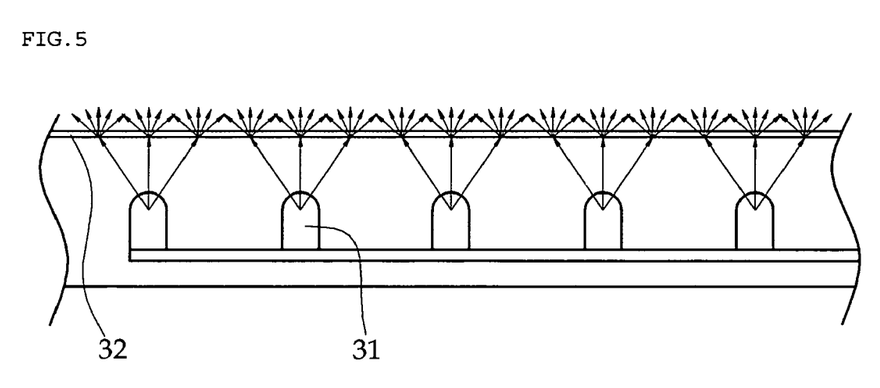
FIG. 5 is a top plan view illustrating the diffusing means of an infrared radiation base in a touch screen using infrared cameras according to an exemplary embodiment of the present invention.

FIG. 3 is an enlarged top plan view illustrating an infrared radiation base in a touch screen using infrared cameras according to an exemplary embodiment of the present invention. FIG. 4 is a front view illustrating an infrared radiation base in a touch screen using infrared cameras according to an exemplary embodiment of the present invention. FIG. 5 is a top plan view illustrating the diffusing means of an infrared radiation base in a touch screen using infrared cameras according to an exemplary embodiment of the present invention.

Referring to FIGS. 3 through 5, the infrared radiation base as illustrated in FIG. 3 is divided into a plurality of sub-bases, in each of which the infrared emitting elements are placed.

The infrared emitting elements 31 are installed toward the screen part. The infrared light emitted from each infrared emitting element 31 is incident onto the infrared camera 20 through the screen part. Further, each infrared emitting element 31 has a cap portion through which the light is emitted, and electrodes located on opposite side of the cap port. Each electrode is directly fixed to a printed circuit board (not shown) or is indirectly fixed to the printed circuit board through a wire. In detail, one sub-base of the infrared radiation base 30 includes one or more printed circuit boards. Thus, at least one infrared emitting element 31 is fixed to the printed circuit board. In the case in which one sub-base of the infrared radiation base 30 includes one printed circuit board, all the infrared emitting elements 31 of one sub-base of the infrared radiation base 30 which are arranged on one edge of the screen part 11 may be fixed to the printed circuit board. Thus, when power is applied through the printed circuit board according to the control signal of the controller (not shown), the infrared emitting elements 31 emit infrared light.

Further, the infrared radiation base 30 includes a diffusing means 32 in front of the infrared emitting elements 31 oriented toward the screen part 11. The diffusing means 32 diffuses the infrared light emitted from the infrared emitting elements 31, so that the infrared light emitted from the infrared emitting elements 31 located at the opposite lateral edges and the lower edge of the screen part 11 is incident onto the entire screen part 11. Thus, as in the related art, it is not necessary to dispose the infrared emitting elements 31 on four edges, i.e. opposite lateral edges, and upper and lower edges, of the screen part 11.

The embodiment of the present invention includes the aforementioned configuration, and the operation thereof will be described in detail with reference to FIGS. 6 through 8.

Figure 6:
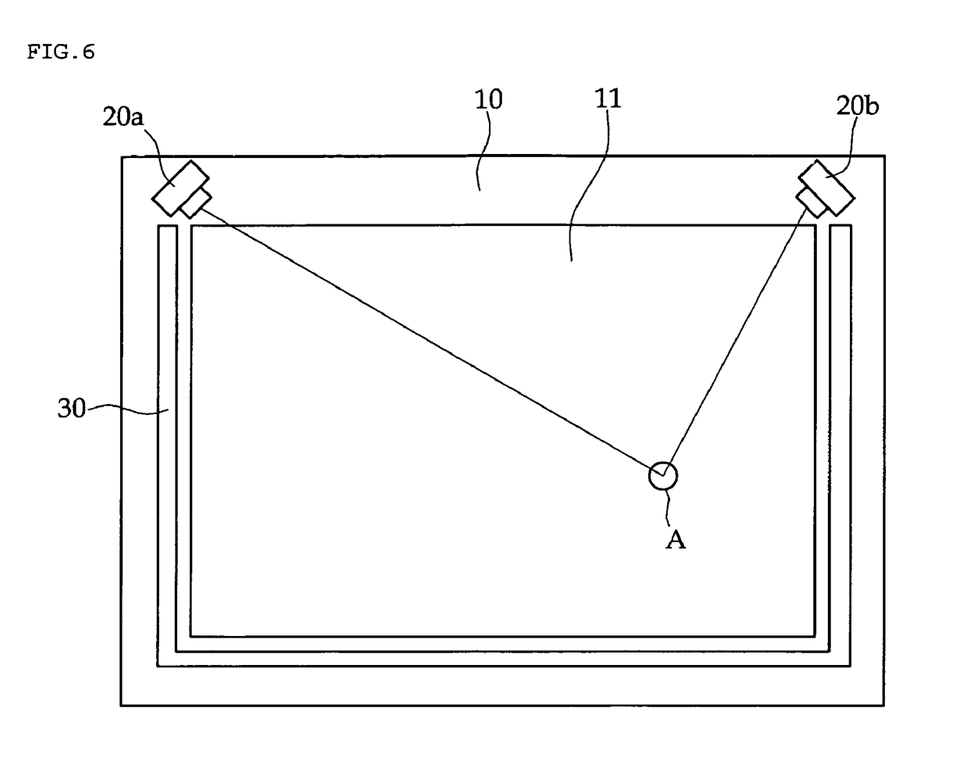
FIG. 6 is a top plan view explaining how a touch position is detected in a touch screen using infrared cameras according to an exemplary embodiment of the present invention.

FIG. 6 is a top plan view explaining how a touch position is detected in a touch screen using infrared cameras according to an exemplary embodiment of the present invention. FIG. 7 schematically illustrates one example of an infrared detector for detecting the touch position of an object in a touch screen using infrared cameras according to an exemplary embodiment of the present invention. FIG. 8 illustrating one example of a touch position photographed by an infrared camera in a touch screen using infrared cameras according to an exemplary embodiment of the present invention.

Figure 7:
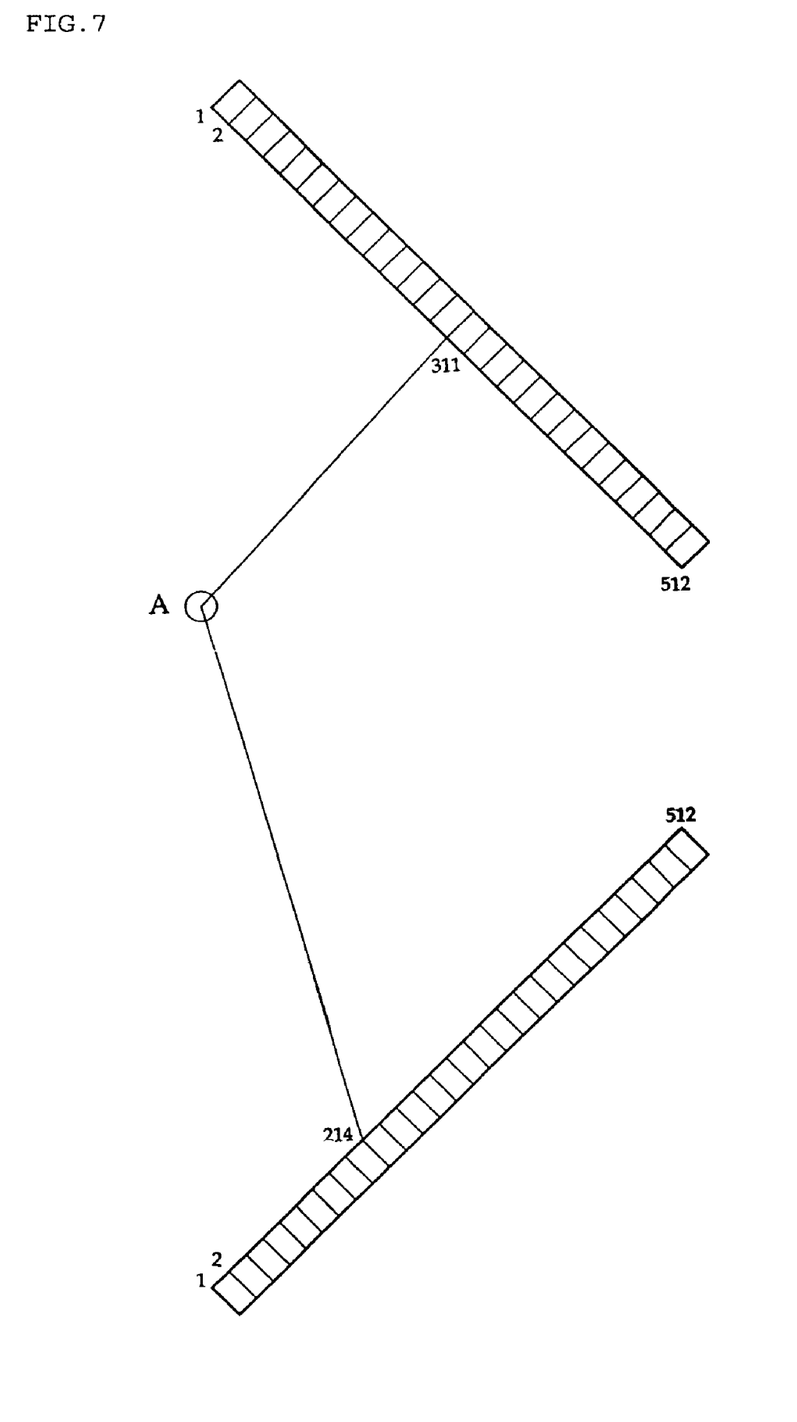
FIG. 7 schematically illustrates one example of an infrared detector for detecting the touch position of an object in a touch screen using infrared cameras according to an exemplary embodiment of the present invention.
Figure 8:
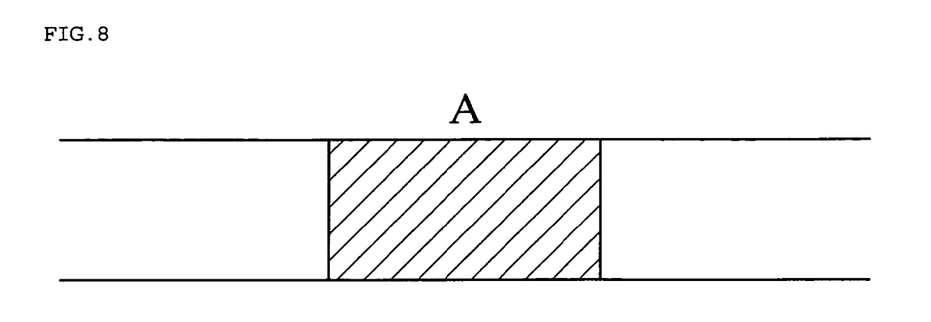
FIG. 8 illustrating one example of a touch position photographed by an infrared camera in a touch screen using infrared cameras according to an exemplary embodiment of the present invention.

Referring to FIGS. 6 through 8, when the touch screen using infrared cameras hardly affected by external disturbance light according to an exemplary embodiment of the present invention is turned on by a user, the infrared emitting elements 31 emit the infrared light. Thus, in each infrared camera 20, the lens 21 receives the infrared light within its own orientation angle, and the band-pass filter 22 passes only the infrared light with a wavelength band ranging from 850 nm to 940 nm and interrupts the infrared light with a wavelength band outside that range. Further, the infrared detector 23 receives the infrared light passing through the band-pass filter 22 by means of the infrared receiving cells thereof, each of which receives the infrared light.

Afterwards, when the user touches part A of the screen part 11 using a finger or a stylus, the infrared light emitted at a corresponding orientation angle is interrupted by the touched object.

At this time, each infrared camera 20 continues to monitor the entire screen part covering the infrared light emitted through the infrared radiation base 30. In the meantime, when any object touching the screen part as described above is detected from the screen part, each infrared camera 20 does not receive the infrared light due to the touched object. This is as illustrated in FIG. 8. In the infrared cameras 20, as illustrated in FIG. 8, the screen part 11 is recognized to be shaped of a horizontal band, and when any object touches the screen part 11, the infrared light is not received at the touched position, the touched position is recognized to have a color different from that of the other untouched position.

More specifically, since each infrared camera 20 recognizes the screen part 11 as a region where the infrared light is emitted, it recognizes either a block color or a white color. For example, before the object is touched on the screen part, each infrared camera 20 recognizes the screen part 11 as a black horizontal band. In contrast, when the object is touched on the screen part, each infrared camera 20 recognizes only the touched position of the screen part 11 as a white color.

Accordingly, the infrared detector 23 of each infrared camera 20 is configured so that the infrared receiving cells thereof receive the infrared light at different orientation angles. Thus, the infrared receiving cells oriented toward the touched position do not receive the infrared light, as described above. The corresponding infrared receiving cells output the detection signals to the interface 24, and then the controller (not shown) receives the detection signals through the interface 24, and thereby determines the touched position of the object.

In detail, the controller checks the infrared receiving cells of the two infrared cameras 20a and 20b which output the detection signals of the object, thereby recognizing the orientation angles of the corresponding infrared receiving cells. For example, when both the number 311 infrared receiving cell of the infrared receiving cells of the infrared camera 20a located at a left-hand upper end of the screen part 11 and the number 214 infrared receiving cell of the infrared receiving cells of the infrared camera 20b located at a right-hand upper end of the screen part 11 detect the touch of the object, a point where the extension lines of the orientation angles of the number 311 left-hand infrared receiving cell and the number 214 right-hand infrared receiving cell intersect with each other is the touched position of the object.

In this manner, the touch screen using infrared cameras hardly affected by external disturbance light according to an exemplary embodiment of the present invention employs the infrared cameras 20 having band-pass filters 22, so that it is not necessary to dispose the infrared emitting elements 31 and infrared receiving elements around the screen part in pairs as in the related art, and the malfunction caused by the external disturbance light can be prevented. Further, the infrared radiation base 30 includes the diffusing means 32, so that the number of infrared emitting elements 31 can be reduced.

What is claimed is:
1. A touch screen comprising:
a body having a screen part to which an image is output;

an infrared radiation base disposed around the screen part in transverse (X axis) and longitudinal (Y axis) directions and divided into a plurality of sub-bases including at least one infrared emitting element emitting infrared light in order to prevent malfunction caused by external disturbance light; and infrared cameras receiving the infrared light emitted from the infrared emitting element of each sub-base of the infrared radiation base, and detecting a position of an object touched on the screen part according to whether or not the infrared light emitted from the infrared emitting element is received, wherein two infrared cameras are provided, each of which has an intersecting orientation angle at one edge of the screen part at which the infrared radiation base is not disposed, and wherein each infrared camera includes:

an infrared detector having a plurality of infrared receiving cells;

a lens having an angle of view for receiving the infrared light incident onto the entire screen part;

a band-pass filter filtering the infrared light with a wavelength band passing through the lens to pass only the filtered infrared light;

an infrared receiver receiving the infrared light filtered by the band-pass filter; and an interface, when the infrared detector detects a touch of an object, outputting the detected results to the body.

2. The touch screen according to claim 1, wherein the infrared detector includes one of a complementary metal oxide semiconductor (CMOS) image sensor and a charge coupled device (CCD) image sensor.

3. The touch screen according to claim 1, wherein the infrared detector is installed on the screen part so as to have the orientation angle of 90 degrees or more, and receives the infrared light emitted from each infrared emitting element within a corresponding orientation angle.

4. The touch screen according to claim 1, wherein the infrared detector includes the plurality of infrared receiving cells, each of which is installed so as to have a different orientation angle and receives the infrared light emitted from each infrared emitting element of the infrared radiation base.

5. The touch screen according to claim 1, wherein the infrared radiation base further includes a diffusing unit for diffusing the infrared light, the diffusing unit being installed on a front face of the infrared radiation base toward which each infrared emitting element is directed.

* * * * *